(12) United States Patent
Reuben

(10) Patent No.: US 10,919,190 B2
(45) Date of Patent: Feb. 16, 2021

(54) METHOD AND APPARATUS FOR FORMING A DOWN FEATHER SHEET BY HEAT INJECTION

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 0 days.

(21) Appl. No.: 15/932,726

(22) Filed: Apr. 16, 2018

(65) Prior Publication Data

US 2019/0315022 A1    Oct. 17, 2019

(51) Int. Cl.
| | |
|---|---|
| *D04H 1/60* | (2006.01) |
| *D04H 1/732* | (2012.01) |
| *D04H 1/02* | (2006.01) |
| *D06M 19/00* | (2006.01) |
| *B29C 41/46* | (2006.01) |
| *B29C 41/28* | (2006.01) |
| *B29C 35/04* | (2006.01) |
| *B29L 7/00* | (2006.01) |
| *B29K 105/00* | (2006.01) |
| *B29K 105/06* | (2006.01) |
| *B68G 3/08* | (2006.01) |

(52) U.S. Cl.
CPC ............ *B29C 41/46* (2013.01); *B29C 35/045* (2013.01); *B29C 41/28* (2013.01); *D04H 1/02* (2013.01); *D04H 1/60* (2013.01); *D04H 1/732* (2013.01); *D06M 19/00* (2013.01); *B29C 2035/046* (2013.01); *B29K 2105/0097* (2013.01); *B29K 2105/06* (2013.01); *B29L 2007/002* (2013.01); *B68G 3/08* (2013.01)

(58) Field of Classification Search
None
See application file for complete search history.

(56) References Cited

U.S. PATENT DOCUMENTS

| | | | | |
|---|---|---|---|---|
| 5,269,992 A * | 12/1993 | Omata | .................... | B29C 67/02 264/109 |
| 5,569,425 A * | 10/1996 | Gill | ....................... | B29C 43/006 264/121 |
| 6,025,041 A * | 2/2000 | Reuben | ................ | A47G 9/0207 428/15 |
| 2004/0126580 A1* | 7/2004 | Gaignard | ................. | D04H 1/02 428/373 |
| 2004/0175532 A1* | 9/2004 | Rainbolt | ................... | B32B 5/26 428/74 |
| 2006/0154061 A1* | 7/2006 | Zhang | ................. | A47G 9/0207 428/370 |

(Continued)

*Primary Examiner* — Mary Lynn F Theisen
(74) *Attorney, Agent, or Firm* — Guy J. Houle; Houle Patent Agency Inc.

(57) ABSTRACT

A method and an apparatus for forming a down feather sheet is described and wherein a mixture of down feathers and a binder material is fused together by injecting hot air under pressure into the mixture. A plurality of hot air injection needles are caused to penetrate into a layer of the mixture as it is conveyed along a conveyor and to release hot air at a temperature sufficient to cause the binder material to fuse together and to the down causing the down and the binder material to be trapped into the layer. The displacement of the hot air injection mechanism is synchronized to the conveying speed and the projection of the needles into the layer is adjusted to the thickness of the layer being conveyed.

20 Claims, 2 Drawing Sheets

(56) References Cited

U.S. PATENT DOCUMENTS

2016/0262556 A1\* 9/2016 Reuben ................ A47G 9/0223
2016/0362547 A1\* 12/2016 Reuben ..................... B32B 5/22
2017/0071367 A1\* 3/2017 Reuben ................ A47G 9/0207

\* cited by examiner

METHOD AND APPARATUS FOR FORMING A DOWN FEATHER SHEET BY HEAT INJECTION

FIELD OF THE INVENTION

The present invention relates to down feather sheets and more specifically to a method and an apparatus for forming a down feather sheet by controlled heat injection to fuse a mixture of down feathers and a binder material together to form a homogeneous down feather sheet.

BACKGROUND OF THE INVENTION

In my U.S. Pat. No. 6,025,041, I describe a first generation down feather sheet and wherein the down feathers are retained in a homogeneous form by a chemical binder agent or rigid fibers and further wherein the down feathers are exposed on all sides of the sheet. A primary purpose of that down feather sheet was to provide a sheet of down feathers for use by the apparel fabricating industry as superior insulation in garments. Such a down feather sheet provided a substantially constant distribution of the down feathers without the requirement of quilting to retain the down in place and thus prevented the development of cold spots in the insulation by the stitching. Because the down feathers are exposed in all outer surfaces of the down feather sheet extra care was necessary to prevent the down feathers from detaching from the faces of the sheet or patterns cut from the sheet.

There is a need to develop a down feather sheet for use in many other applications to provide improved thermal insulation, such as in the construction of vehicles where the passenger enclosure which is climatically controlled during hot or cold weather condition needs to be well insulated. Countless other applications exist as one can imagine. However, for such commercial use, as well as in the fabrication of articles of apparel, there is a need to retain the down feathers captive in the sheets.

Another problem with down insulating products, such as used in articles of apparel is that when such articles are washed in a washing machine, the down has a tendency to form clumps and the minute down clusters can come out of the lining fabric particularly at the seam areas where there are needle holes. Ideally, such products should be dry cleaned but still the down clusters, being very small and unstable, can be drawn out of the lining fabric. Such affects the insulating quality and the aesthetic appearance of the garment.

More recently, such down feather sheets have been held captive between sheets of non-woven fabrics adhered to opposed top and bottom surfaces of the sheets and held thereto by a glue binder present at the interface with the down sheet. Although, that solution did prevent some escapement of the down feathers, it did not provide for the use of such material in other industrial manufacturing applications as the material, although flexible did not provide for stretching of the sheet to attach it to flexible and rigid shaped objects and in restricted spaces where it is necessary for the sheet to stretch. Also, when used in garments in areas where movement is required such as in underarm areas or knee areas of clothing, rigid down insulating sheets when stretched would tear to form clumps of insulation which would gather in specific areas and become visible to the eye and form cold spots in the garment. Therefore, that improvement did not overcome these existing problems to extend the use of such down feather sheets.

It is desirable to form a down feather sheet comprised of a core mixture of down feather material with a binder as described in my above mentioned patent. However, I have found that because the down clusters are very unstable and difficult to manipulate, and particularly so if conveyed in a thermal chamber or oven without a scrim sheet on the top surface thereof, the air flow in the chamber causes the down clusters to disperse from the exposed surfaces of the sheet of loose down feathers making it difficult to produce a homogeneous sheet solely of down feathers and a binder material mixture.

SUMMARY OF THE INVENTION

It is a feature of the present invention is to provide a thermally insulating homogeneous down feather sheet formed solely by a down core structure and a method of fabricating same.

Another feature of the present invention is to provide a method of fabricating a homogeneous thermally insulating down feather sheet comprised of a mixture of down feather material mixed with a binder material in predetermined proportions and heat set together while overcoming the above mentioned disadvantages of the unstable down material when not using scrim sheets to retain the mixture captive during the binder fusing cycle.

It is a further feature of the present invention to provide a thermally insulating down sheet formed by a core structure which is breathable, soft, lightweight, and without the use of scrim sheets while substantially preventing the escape of down clusters from the exposed surfaces of the down sheet.

Another feature of the present invention is to provide a down sheet formed from down material bonded together by glue particles and/or polymer fibers mixed in predetermined proportions to form a down core sheet and wherein the binder material is fused by needle injection of hot air under a predetermined pressure into the core of a layer of down feathers and binding material mixture with the outer surfaces of the layer having been restrained to prevent the escapement of down clusters.

A still further feature of the invention is to provide a method and an apparatus for injecting hot air under a predetermined pressure into the core of a down feather and binder material mixture layer as it is being conveyed on a conveyor.

According to the above features, from a broad aspect, the present invention provides a method of forming a down feather sheet comprising the steps of:

i) mixing in a mixing chamber down material with a binder material in predetermined proportions to form a down/binder mixture, ii) depositing the down/binder mixture on a conveyor in motion to form a down insulation layer of predetermined thickness, iii) restraining exposed surfaces of the down insulation layer above the conveyor along a first conveyor length, iv) curing the down/binder mixture in the down insulation layer by injecting heated air into the down/binder mixture at a temperature sufficient to cure the binder material and under a predetermined air pressure while the down insulation layer is being displaced by the conveyor in motion to form a homogeneous down insulation sheet.

According to another broad aspect of the invention there is provided an apparatus for forming a down feather sheet formed from a mixture of down feathers and binder material. The apparatus comprises a conveyor for conveying the mixture from a mixing chamber. A hot air injection mechanism is supported above the conveyor. The hot air injection mechanism has a plurality of perforated hollow needles supported in a pattern by a plenum chamber to admit hot air under predetermined air pressure in the needles. A needle housing is secured to the mechanism below the plenum chamber for housing in close sliding contact an air injection length of said needles in which holes are formed about their circumference. Adjustable vertical displacement means is provided to displace the plenum chamber with respect to the needle housing to cause the needles to extend out of a lower surface of the needle housing a predetermined distance. Restraining means is also provided to restrain exposed surfaces of the down and binder material above the conveyor along a first conveyor length from the mixing chamber. Horizontal displacement means displaces the air injection mechanism in synchronism with the speed of the conveyor from a second conveyor length to a third conveyor length wherein the mixture of down feathers and binder is gradually fused together during displacement by the conveyor.

BRIEF DESCRIPTION OF THE DRAWINGS

A preferred embodiment of the present invention is described with reference to the accompanying drawings in which:

FIG. 5 is an enlarged fragmented view showing an exposed portion of the hot air injection needles disposed into the down feather and binder material mixture and a concealed portion of the needles remaining in the needle housing wherein the holes in the needles are shielded by the housing solid mass, and FIG. 6 is a block diagram of the control network to control the operation of the apparatus in synchronism.

DESCRIPTION OF THE PREFERRED EMBODIMENT

Figure 1:
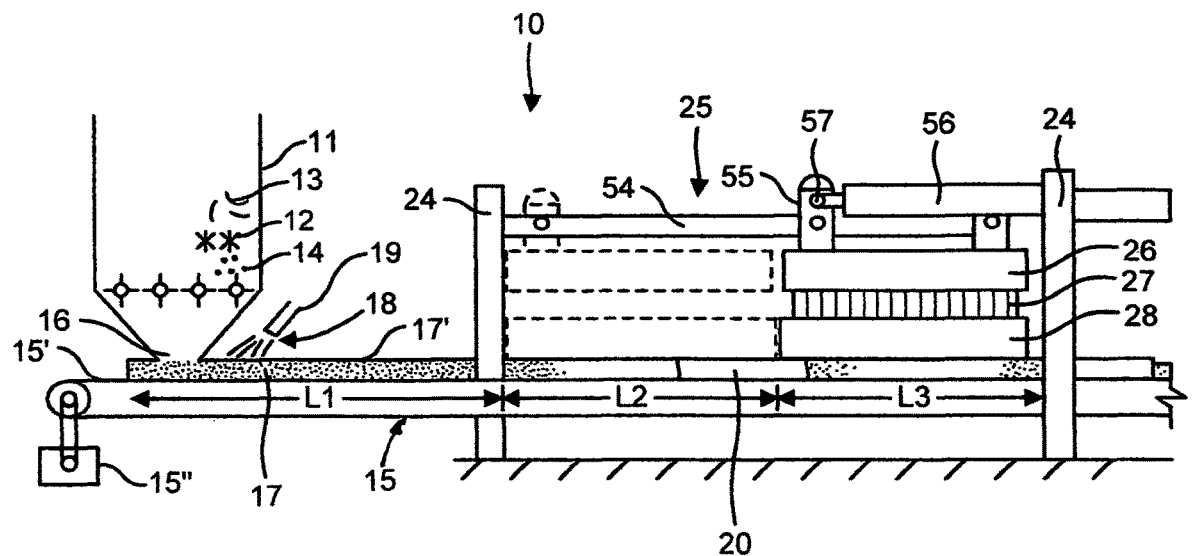
FIG. 1 is a simplified side view illustrating the construction of the apparatus of the present invention for forming the homogeneous down feather sheet and wherein hot air under predetermined pressure is injected into the core of a layer of down feathers and a binder material as it is being conveyed on a conveyor belt.

Referring now to the drawings and more particularly to FIG. 1 there is shown generally at 10 the construction of the down sheet forming apparatus. It is comprised of a mixing chamber 11 in which is mixed a predetermined quantity of down feather clusters 12 mixed with a binder material which may be comprised of binding fibers 13 or dry glue particles 14 or combinations thereof. Such mixing chambers are known in the art and described in my earlier patents and pending patent applications. A conveyor 15 is displaced below the discharge end 16 of the mixer which deposits a layer 17 of the mixture on the conveyor belt 15'. By controlling the speed of the conveyor drive 15", the thickness of the deposited layer 17 is adjusted to a desired thickness.

As shown in FIG. 1, has the layer 17 is displaced from under the discharge end 16 of the mixer 11 a layer of glue 18 is sprayed on the top surface 17' of the layer 17 whereby to restrain the top surface of the mixture preventing the down clusters from escaping from the top surface of the layer 17. Side walls 20 are disposed to each side of the layer 17 to also restrain the side surfaces of the layer 17. In my co-pending CIP application Ser. No. 15/932,579, filed on Mar. 19, 2018 and entitled "Thermally Insulating Sheet Formed From A Down Core Structure And Method Of Fabrication" there is disclosed another system for restraining the down binder mixture wherein the top surface and side surface of the mixture is fused before entering a heating chamber.

Figure 2:
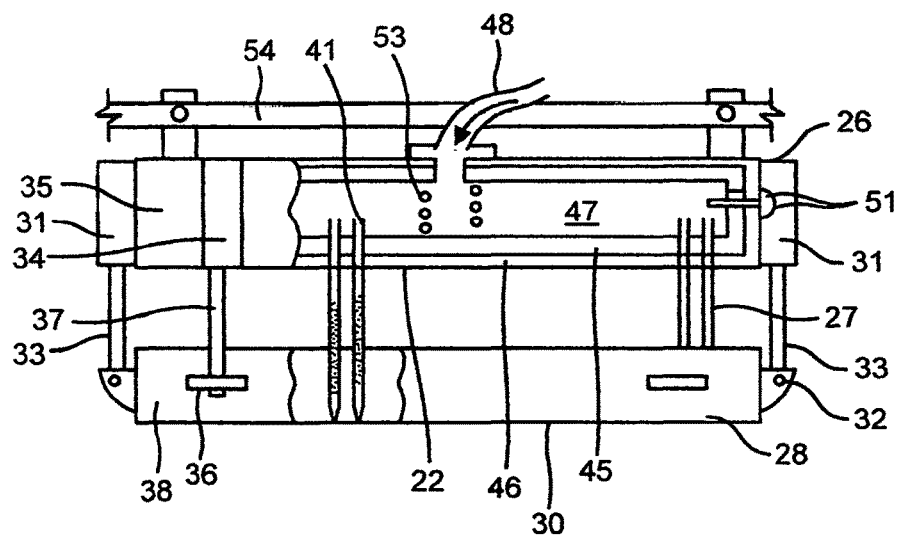
FIG. 2 is a fragmented side view illustrating the construction of the hot air injection mechanism and the manner in which the air injection needles are secured to the plenum chamber and the needle housing.
Figure 3:
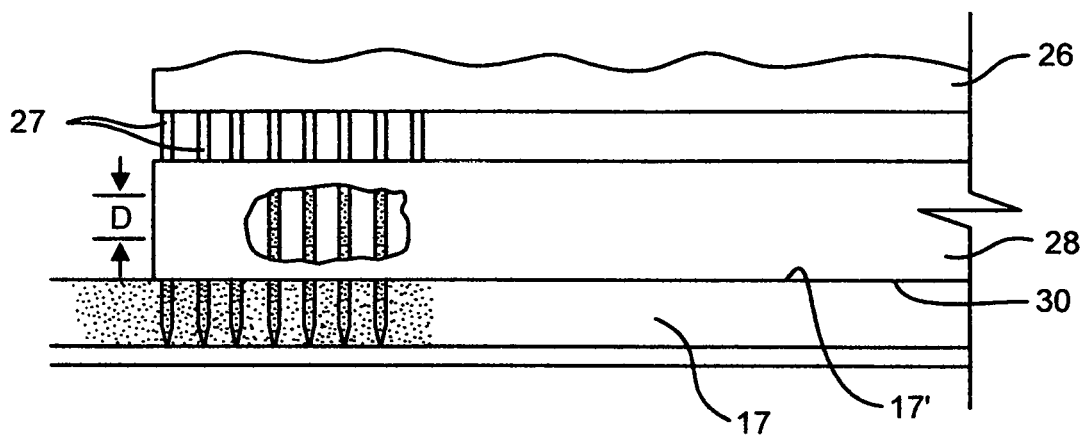
FIG. 3 is a fragmented side view showing the hot air injection needles displaced into the core of the down feather and binder material mixture for fusing the core material and with the plenum chamber lowered towards the needle housing a predetermined distance depending on the layer thickness.
Figure 4:
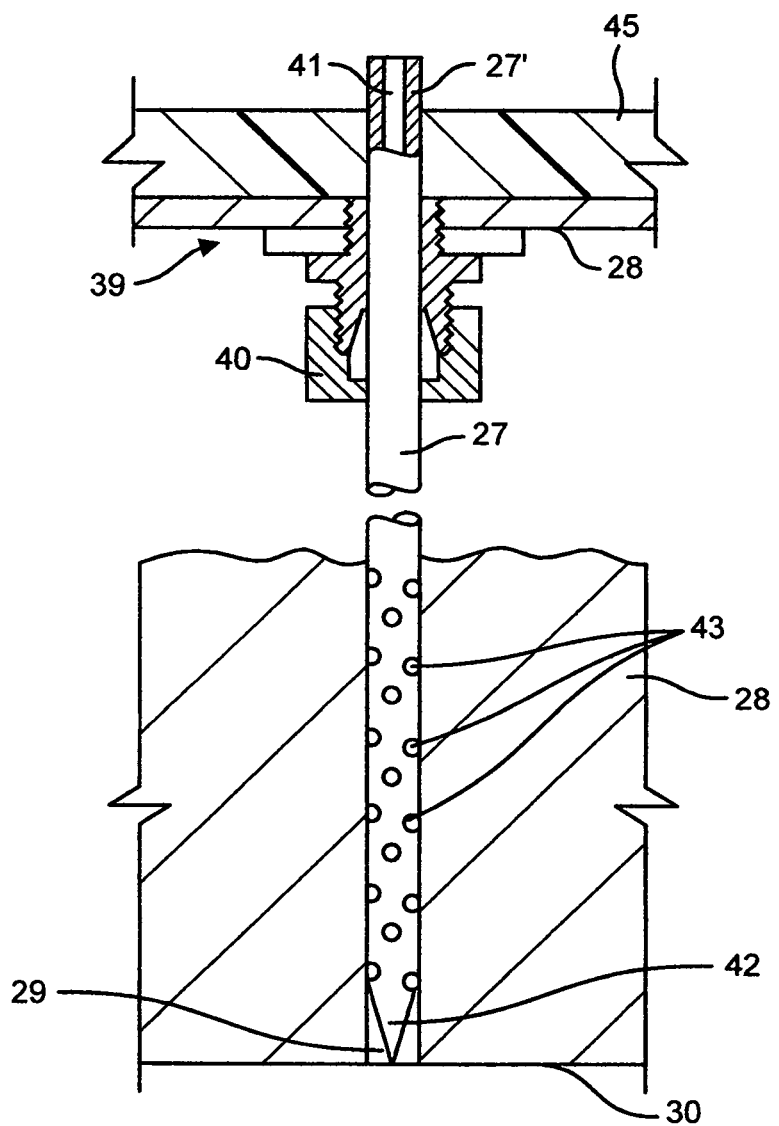
FIG. 4 is an enlarged view showing the construction of the needles and their attachment to the plenum chamber and relationship to the needle housing.

With the present invention, the core of the restrained down binder mixture layer 17 is fused or caused to bind by a hot air injection mechanism 25 which is supported above the down and binding material layer 17 by a frame 24. With further reference to FIGS. 2 to 4, the hot air injection mechanism 25 is comprised of a plenum chamber 26 in which is supplied hot air at a predetermined pressure, as will be described below. A plurality of hollow air injecting needles 27 are secured to the plenum chamber 26 and project from the lower flat surface 22 of the chamber and extend into aligned holes 29 for close sliding fit in a solid mass needle housing 28. By displacing the plenum chamber 26 in the direction of the needle housing 28, the needles extend out of the lower flat surface 30 of the needle housing and penetrate into the down and binder layer 17. The needle housing 28 is for example formed of a nylon material block or other suitable material for its intended purpose of housing the needles in close frictional sliding contact and resisting to the heat generated by the hat air in the needles in contact therewith.

As can be seen from FIG. 2, the plenum chamber 26 is secured to the needles chamber 28 by cylinders 31 attached to the plenum chamber with their piston rod ends 32 secured to the needles chamber. By controlling the stroke distance of the piston rods 33 the projecting distance of the needles 27 from the lower flat surface 30 is controlled. The needles chamber 28 is also displaceable vertically by cylinders 34 secured to the plenum chamber outer side wall 35 with its piston rod ends 36 secured to the side wall 38 of the needle housing 27. By withdrawing or extending the piston rod 37 the slower surface 30 of the needle housing is adjusted during the withdrawing cycle and repositioned during the needles application cycle.

As shown in FIG. 4, the needles 27 are elongated straight hollow needles which are removably secured into the lower flat surface 22 of the plenum chamber 26 by interlocking fittings 39 and a seal compressing nut 40 with a top end 27' of the needles projecting inside the plenum chamber to received hot air under pressure in its top open end 41. The other end of the needles are terminated in a solid pointed end 42 to penetrate through the upper surface of the down and binder material upper surface and into the core of the down and binder material mixture layer 17. With the needles in their retracted position, as illustrated in FIG. 4, the perforated section of the needles is disposed captive in the needle housing 28 and causes the compressor to stop. The perforated section is comprised of a plurality of small holes 43 formed about the circumference of the needles and through which is injected hot air under pressure into the core of the layer 17, as shown in FIG. 5. The needles are also of very small diameter not to form unpleasant noticeable needle holes in the upper surface of the down sheet after it has been fully bonded together. Any needle holes formed by the needles are sealed by the het fusing process preventing the escapement of down clusters.

The thickness "D" of the solid core needle housing 28 is equal to the maximum thickness of the down feather sheet desired to be formed by the forming apparatus 10. If the down sheet being formed is of a thickness of two (2) inches, then the plenum chamber is displaced two inches towards the needle housing to cause the needles 27 to project into the down and binder material layer 17 a distance of two inches.

As shown in FIG. 2 the plenum chamber 28 is lined with a thermally insulating material 45 on the inner surface of its outer walls 46 to maintain a temperature in the range of from about 150 to 160 degrees Fahrenheit in its chamber 47. An insulated conduit 48 supplies hot air under pressure from an air heater 49 which may be an electric or gas heater and into which a compressor 50 supplies ambient air to be heated thereby. A temperature sensor 51 senses the air temperature within the chamber 47 and supplies a temperature signal to the controller 52 which control the heater and the compressor. Should the temperature in the chamber 47 reduce to a predetermine low temperature value, a further electric heating coil 53, mounted within the chamber 47 is actuated to quickly raise the temperature in the chamber to maintain a temperature in the chamber 47 sufficient to cause the powder glue 14 and/or the binding fibers 13 to melt or soften to bind together and to the down material to form a stable homogeneous down layer which is them conveyed to a cooling chamber or other suitable cooling means.

The top open end 41 of the needles project into the chamber 47 and are in substantially aligned formation. When the assembly of the plenum chamber 26 and the needle housing 28 is brought down with the bottom surface 30 of the needle housing in contact with the top surface 17' surface of the down and binder material mixture, immediately the assembly is displaced at the same speed as the conveyor belt 17 and the plenum is actuated towards the needle housing to cause the needles 27 to penetrate into the layer 17. As shown in FIG. 1, the assembly of the plenum and needle housing is supported by a carriage 55 which is displaced on a track 54 mounted above the conveyor and extending in parallel relationship to the conveyor. A piston 56 is secured to the frame work 24 and has its piston rod end 57 secured to the carriage 55.

As soon as the needle housing bottom surface 30 is brought down on the upper surface 17' of the layer mixture 17, the piston is actuated by displacing its piston rod in synchronism with the speed of the conveyor belt. Also, as soon as the needles 27 extend out of the lower surface 30 of the needle housing 28 hot air under control pressure is exhausted from the needle holes 43 in a control manner. As shown in FIG. 5, the spacing between the needles 27 is calculated whereby the pressure of the injected hot air will be sufficient to inject hot air into the mixture in a multi-directional distribution pattern, as illustrated, to fuse all of the binder material to trap the down clusters 12. As the conveyor is displaced, fusing of the mixture takes place extending to the conveyor surface to form a fused bottom layer surface for the layer. This fusing cycle takes place from a second conveyor length L2 to a third conveyor length L3 of displacement of the assembly depending on the fusing time.

Once the assembly reaches the end of the third conveyor length L3, the assembly is disengaged from the top surface 17' of the layer and quickly displaced to the $2^{nd}$ conveyor length with the fusing cycle repeating and this is done with a very short time within the displacement time Dt as shown in FIG. 5 which is half the distance between adjacent rows of needles 27. Because the needles in the last row of needles, see needle 27', fuses the binder in the upstream direction of the mixture layer 17, a distance of Dt, see the fused binder 58 in FIG. 5, the rows of needles in the downstream end of the needles chamber 28, as soon as they penetrate into the layer at conveyor length L2, will start injecting fusing air into the downstream direction to join the fused binder material 58 from the upstream needles of the previous cycle. Accordingly, all of the binder material in the layer will be fused together in a substantially uniform manner The method of operation of the hot air injection mechanism 25 and associated system will now be described. Down material mixed with a binder material, in predetermined proportion, forms a down/binder mixture which is deposited on a conveyor 15 in motion to form a down insulation layer of predetermined thickness. At least a top surface 17' of the down insulation layer is restrained and conveyed along a first conveyor length L1 and then enters the hot air injection mechanism 25 at a second conveyor length L2 where the down/binder is cured by injecting heated air into said down/binder mixture at a temperature sufficient to cure the binder material, and under predetermined air pressure, while the down insulation layer is being displaced by the conveyor in motion from conveyor length L2 to conveyor length L3. The length of this displacement from L2 to L3 is determined by the time required to completely fuse the binder material to form a homogeneous down insulation sheet.

The restrainment of the down clusters in the exposed surfaces of the down and mixture material layer 17 deposited on the moving conveyor can be effected, for example, by conveying the down/binder mixture on the conveyor between opposed side plates 20 in frictional contact with the conveyed down/binder mixture layer 17 and applying a glue binder 18 over a top surface 17' of the down/binder mixture to stabilize the down cluster at the top surface 17'.

The fusing of the binder material is accomplished by displacing the hot air injection mechanism 25 in synchronism with the displacement of the conveyor belt 15 over the top surface 17' of the down/binder mixture 17 along a second conveyor length L2 and simultaneously displacing the air injection needles 27 to penetrate into the down/binder mixture to inject a controlled pressurized stream of hot air into the down/binder mixture along the third conveyor length L3 to cause the binder material to bond with the down feather clusters. Thereafter, the mechanism 25 retracts the hot air injection needles 27 into the needle housing 28 as the housing is displaced with the conveyor to arrest the supply of hot air due to the fact that the needles with the holes therein are obstructed by its close sliding fit within the holes in the needle housing solid block. Thereafter, the hot air injection assembly 25 is quickly displaced back to the second conveyor length L2 and repeats its hot air fusing cycle.

The plurality of air injection needles 27 are hollow needles having a pointed free end and holes formed about a circumference of the needles along a predetermined length for multi-directional hot air dispersion into the down and binder material mixture 17. Only a lower portion of the needles corresponding to the thickness of the layer 17 is extended out from the lower surface 30 of the needle housing 28 while the lower surface 30 is in contact with the upper surface 17' of the layer 17.

It is within the ambit of the present invention to cover any obvious modifications of the embodiment described herein provided such modifications fall within the scope of the appended claims. For example, the hot air injection mechanism described herein can be used to fuse the core of a down and binder material mixture restrained by a top scrim sheet or by opposed scrim sheets. Further, instead of controlling a cylinder 56 to displace the mechanism 25, a timing belt can be used to perform the same function with high precision.

The invention claimed is:

1. A method of forming a down feather sheet comprising the steps of:
   i) mixing in a mixing chamber down material with a binder material in predetermined proportions to form a down/binder mixture,
   ii) depositing said down/binder mixture on a conveyor in motion to form a down insulation layer of predetermined thickness,
   iii) restraining exposed surfaces of said down insulation layer above said conveyor along a first conveyor length,
   iv) curing said down/binder mixture in said down insulation layer by injecting heated air into said down/binder mixture at a temperature sufficient to cure said binder material and under predetermined air pressure while said down insulation layer is being displaced by said conveyor in motion to form a homogeneous down insulation sheet.

2. The method as claimed in claim 1 wherein said step (iii) comprises conveying said down/binder mixture on said conveyor between opposed side plates in frictional contact with said conveyed down/binder mixture and applying a glue binder over a top surface of said down/binder mixture to stabilize said down/mixture at said top surface.

3. The method as claimed in claim 1 wherein said step (iii) comprises heating the top and side surfaces of said down/binder mixture to cause said binder material in said top and side surfaces to bond and trap said down/binder mixture in the core of said down/binder mixture layer.

4. The method as claimed in claim 1 wherein said step (iv) comprises displacing a hot air injection assembly in synchronism with the displacement of said conveyor belt over a top surface of said down and binder material mixture along a second conveyor length and simultaneously displacing air injection needles to penetrate into said down/binder mixture to inject a pressurized stream of hot air into said down and binder material mixture along a third conveyor length to cause said binder material to bond with said down feathers, and (v) retracting said hot air injection needles.

5. The method as claimed in claim 4 wherein said step (v) comprises retracting said hot air injection needles into a needle housing to arrest the supply of hot air throughout said needles and (vi) simultaneously displacing said hot air injection assembly back to said second conveyor length and repeating said step (iv).

6. The method as claimed in claim 4 wherein said step (iv) further comprises injecting said hot air into said down and binder material mixture for a predetermined time while said conveyor is in motion to cause said hot air to disperse throughout said down insulation layer.

7. The method as claimed in claim 5 wherein said plurality of air injection needles are hollow needles having a pointed free end and holes formed about a circumference of said needles along a predetermined length for multi-directional hot air dispersion, and wherein said step of displacing said hot air injection needles comprises displacing said hot air injection needles out of a lower surface of said needle housing a predetermined corresponding to the thickness of said layer of down/and binder material mixture, said lower surface of said needle housing being in contact with said top surface of said down material layer.

8. The method as claimed in claim 7 wherein said hollow needles are secured to a hot air plenum chamber with an open rear end of said needles in contact with hot compressed air in said plenum chamber, said step of displacing said hot air injection needles comprising displacing said plenum chamber a predetermined distance towards said needle housing to cause said needles to extend out of said lower surface of said needle housing a distance equal to said predetermined thickness of said down insulation layer.

9. The method as claimed in claim 7 wherein said step (v) further comprises retracting said needle housing to separate said lower surface of said needle housing from said top surface of said down/binder mixture.

10. Apparatus for forming a down feather sheet formed from a mixture of down feathers and binder material, said apparatus comprising a conveyor for conveying said mixture from a mixing chamber, a hot air injection mechanism supported above said conveyor, said hot air injection mechanism having a plurality of perforated hollow needles supported in a pattern by a plenum chamber to admit hot air under predetermined pressure in said needles, a needle housing secured to said mechanism below said plenum chamber for housing in close sliding contact an air injection length of said needles in which holes are formed about their circumference, adjustable vertical displacement means to displace said plenum chamber with respect to said needle housing to cause said needles to extend out of a lower surface of said needle housing a predetermined distance, restraining means to restrain exposed surfaces of said down and binder material above said conveyor along a first conveyor length from said mixing chamber, horizontal displacement means to displace said air injection mechanism in synchronism with the speed of said conveyor from a second conveyor length to a third conveyor length wherein said mixture of down feathers and binder is gradually fused together during displacement of said conveyor.

11. The apparatus as claimed in claim 10 wherein said plenum chamber is an elongated housing having a flat bottom surface to which said needles are removably secured in transverse alignment with said flat bottom surface, said needles having a pointed outer piercing end and an open rear end in contact with said plenum chamber, a perforated section from said pointed end towards said open rear end, a conduit secured to said plenum chamber for admitting hot air under said predetermined pressure into said plenum chamber and into said open rear end of said needles, and a controller for controlling the operation of an air compressor to supply hot pressurized air to said needles for injection into said mixture of down feathers and binder material.

12. The apparatus as claimed in claim 11 wherein said plenum chamber has a thermally insulating lining material secured to inner walls of said plenum chamber, and an air temperature sensor connected to said plenum chamber to communicate temperature signals to said controller.

13. The apparatus as claimed in claim 12 wherein said plenum chamber is further provided with a heating coil to heat air in said plenum chamber and operated by said controller to maintain a minimum hot air temperature in said plenum chamber for injecting into said down feather and binder material to fuse said binder material.

14. The apparatus as claimed in claim 11 wherein said adjustable vertical displacement means is a controllable piston rod stroke for displacing said plenum chamber to and from a top wall of said needle housing along guide rods to extend and retract said hot air hollow injection needles from said flat bottom surface of said needle housing.

15. The apparatus as claimed in claim 14 wherein said needle housing is a solid mass housing having a plurality of vertical holes therein for close frictional contact with said needles, said solid mass having a thickness for causing an obstruction to said perforated section of said needles when said needles are retracted into said needle housing, said needles when retracted into said needle housing arresting hot pressurized air from being released through holes distributed about each of said needles along said perforated section.

16. The apparatus as claimed in claim 15 wherein said solid mass has a thickness which is equal to or greater than the maximum thickness of said mixture of down feathers and binder material to be deposited on said conveyor belt.

17. The apparatus as claimed in claim 10 wherein said restraining means is constituted by one of a pair of side guide plates disposed on opposed sides of a top surface of said conveyor from said mixing chamber and extending along said first conveyor length and a binder glue applied to a top surface of said down feathers and binder material mixture adjacent a deposit opening of said mixing chamber, and a top and side contact surface which is heated for fusing said top and side surfaces of said mixture along said first conveyor length.

18. The apparatus as claimed in claim 10 wherein said hot air injection mechanism is secured to a pair of horizontal guide rails immovably secured above said conveyor in parallel relationship therewith, said mechanism being secured to a carriage displaceable along said guide rails, said horizontal displacement means being comprised by one or more speed controlled devices for retracting said carriage from said third conveyor length to said second conveyor length in a single quick movement and displacing said carriage from said second conveyor length to said third conveyor length in said synchronism with the speed of said conveyor.

19. The apparatus as claimed in claim 18 wherein said one or more speed controlled devices are one of a piston cylinder and a motor driven timing belt.

20. The apparatus as claimed in claim 10 wherein said binder material is one of a heat activatable powder glue, binding polymeric fibers, and a combination of powder glue and said binding fibers.

* * * * *